(12) United States Patent
Tomczak et al.

(10) Patent No.: US 11,046,807 B2
(45) Date of Patent: Jun. 29, 2021

(54) FLAME-RESISTANT POLYMER POLYOL DISPERSION

(71) Applicant: PCC Rokita SA, Brzeg Dolny (PL)

(72) Inventors: Marcin Tomczak, Wroclaw (PL); Herve Wuilay, Wollerau (CH); Michal Salasa, Jablonna (PL); Lukasz Makula, Jelenia Gora (PL); Kevin Pickin, Southham Ladbroke (GB); Uwe Storzer, Tubingen (DE)

(73) Assignee: PCC ROKITA SA, Brzeg Dolny (PL)

( * ) Notice: Subject to any disclaimer, the term of this patent is extended or adjusted under 35 U.S.C. 154(b) by 0 days.

(21) Appl. No.: 15/753,251

(22) PCT Filed: Aug. 17, 2016

(86) PCT No.: PCT/EP2016/069536
§ 371 (c)(1),
(2) Date: Feb. 16, 2018

(87) PCT Pub. No.: WO2017/029337
PCT Pub. Date: Feb. 23, 2017

(65) Prior Publication Data
US 2018/0223032 A1 Aug. 9, 2018

(30) Foreign Application Priority Data
Aug. 18, 2015 (EP) .................... 15181476

(51) Int. Cl.
| C08G 18/32 | (2006.01) |
| C08G 18/38 | (2006.01) |
| C08G 18/40 | (2006.01) |
| C08G 18/48 | (2006.01) |
| C08G 18/62 | (2006.01) |
| C08G 18/65 | (2006.01) |
| C08G 18/66 | (2006.01) |
| C08G 18/76 | (2006.01) |
| C08J 9/12 | (2006.01) |
| C08G 18/22 | (2006.01) |
| C08G 18/24 | (2006.01) |
| C08G 18/08 | (2006.01) |

(52) U.S. Cl.
CPC ..... *C08G 18/7621* (2013.01); *C08G 18/0876* (2013.01); *C08G 18/222* (2013.01); *C08G 18/246* (2013.01); *C08G 18/3206* (2013.01); *C08G 18/3281* (2013.01); *C08G 18/3819* (2013.01); *C08G 18/3887* (2013.01); *C08G 18/3889* (2013.01); *C08G 18/40* (2013.01); *C08G 18/409* (2013.01); *C08G 18/4829* (2013.01); *C08G 18/4883* (2013.01); *C08G 18/6283* (2013.01); *C08G 18/6547* (2013.01); *C08G 18/6685* (2013.01); *C08J 9/125* (2013.01); *C08G 2110/005* (2021.01); *C08G 2110/0008* (2021.01); *C08G 2110/0083* (2021.01); *C08J 2203/10* (2013.01); *C08J 2205/06* (2013.01); *C08J 2375/08* (2013.01)

(58) Field of Classification Search
CPC ............ C08G 18/0876; C08G 18/3275; C08G 18/3887; C08G 18/3889; C08G 18/409; C08G 18/165; C08G 18/222
See application file for complete search history.

(56) References Cited

U.S. PATENT DOCUMENTS

| 3,076,010 | A | | 1/1963 | Beck et al. | |
| 4,497,913 | A | * | 2/1985 | Raes ................. | C08G 18/0876 521/137 |
| 8,575,225 | B2 | | 11/2013 | Layman, Jr. et al. | |
| 9,000,118 | B2 | | 4/2015 | Mispreuve et al. | |
| 2008/0167394 | A1 | | 7/2008 | Haas et al. | |
| 2014/0329925 | A1 | * | 11/2014 | Cookson ................ | H05B 37/00 521/168 |
| 2018/0244830 | A1 | | 8/2018 | Tomczak et al. | |
| 2019/0040088 | A1 | | 2/2019 | Gorecki et al. | |

FOREIGN PATENT DOCUMENTS

| GB | 991799 A | * | 5/1965 | ............ C07F 9/4006 |
| GB | 2072204 | | 9/1981 | |
| JP | 2013023580 | | 2/2013 | |

(Continued)

OTHER PUBLICATIONS

International Search Report for PCT/EP2016/069536 dated Nov. 10, 2016.
International Preliminary Report on Patentability for PCT/EP2016/069533 dated Jan. 8, 2018.
International Preliminary Report on Patentability for PCT/EP2016/069536 dated Mar. 1, 2018.
International Search Report for PCT/EP2016/069533 dated Oct. 31, 2016.
Written Opinion of the International Searching Authority for PCT/EP2016/069533 dated Oct. 31, 2016.
Written Opinion of the International Searching Authority for PCT/EP2016/069536 dated Nov. 10, 2016.

(Continued)

*Primary Examiner* — Melissa A Rioja
(74) *Attorney, Agent, or Firm* — Honigman LLP; Andrew N. Weber; Jonathan P. O'Brien

(57) ABSTRACT

The invention relates to a process for preparing a flame-resistant polymer-modified polyol having a solids content of 1 to 65 wt. % wherein (i) at least one polyisocyanate and (ii) an olamine are reacted in (iii) a base polyol having at least two active hydrogen containing groups of which more than 50% are primary active hydrogen containing groups and wherein the olamine has at least one phosphonic ester group attached to a tertiary nitrogen atom and contains at least two hydroxyl groups. The invention further relates to a flame-resistant polymer-modified polyol obtainable with the process of the invention, to a process for preparing optionally foamed plastics using the polymer-modified polyol of the invention, and to the use of a polymer-modified polyol for the preparation of flexible polyurethane foams.

20 Claims, No Drawings

(56) References Cited

FOREIGN PATENT DOCUMENTS

| WO | 92/02567 | 2/1992 | |
|---|---|---|---|
| WO | WO-0073363 A1 * | 12/2000 | ......... C08G 18/0876 |
| WO | 2008/116605 | 10/2008 | |
| WO | 2012/154820 | 11/2012 | |
| WO | 2012/154831 | 11/2012 | |
| WO | 2013/101524 | 7/2013 | |
| WO | 2013/148252 | 10/2013 | |
| WO | 2014/200452 | 12/2014 | |
| WO | 2015/038825 | 3/2015 | |
| WO | 2017/140609 | 8/2017 | |
| WO | 2017/029334 | 2/2018 | |

OTHER PUBLICATIONS

"Triphenyl phosphate", PubChem, CID 8289—National Center for Biotechnology Information, PubChem Database, https:// pubchem.ncbi.nlm.nih.gov/compound/Triphenyl-phosphate (accessed on Jul. 9, 2019), Mar. 26, 2005.

Donghwan, Yoon et al., "Dynamics and Mechanism of Flame Retardants in Polymer Matrixes: Experiment and Simulation", Journal of Physical Chemisty B, vol. 117, No. 28, Jun. 24, 2013, pp. 8571-8578.

International Preliminary Report on Patentability for PCT/EP2017/053115 dated May 24, 2018.

International Search Report for PCT/EP2017/053115 dated Apr. 7, 2017.

Written Opinion of the International Searching Authority for PCT/EP2017/053115 dated Apr. 7, 2017.

\* cited by examiner

FLAME-RESISTANT POLYMER POLYOL DISPERSION

CROSS REFERENCE TO RELATED APPLICATIONS

This application is the national phase entry of PCT Application No. PCT/EP2016/069536 filed on Aug. 17, 2016, which claims priority to Foreign Application No. EP15181476.1 filed on Aug. 18, 2015. The entire contents of these applications are incorporated herein by reference.

The invention relates to a process for preparing a flame-resistant polymer-modified polyol dispersion, to the polymer-modified polyol dispersion obtainable according to this process, and to the use of the dispersion in the manufacture of flame-resistant polyurethane plastics, preferably flexible polyurethane foams.

Organophosphorus compounds have been used as flame retardants in plastics for many years. Compounds comprising phosphorus in high oxidation states are especially suitable for conferring flame resistance on foamed polyurethanes because in the event of a fire said compounds react with the polymer to form a glassy crosslinked structure to inhibit air ingress and prevent the egress from the substrate of pyrolysis gases that are combustible.

Halogenated flame retardants such as the tris(2-chloroethyl) phosphate (TCEP) formerly used in flexible PU foams form highly corrosive hydrohalic acids in the event of a fire and are also toxicologically concerning. These flame retardants therefore cannot be registered under the REACH process and hence can no longer be used within the European Union.

An improvement is the advent of reactive flame retardants which, in the case of polyurethane plastics chemically react during the polyaddition reaction together with the polyol component and the polyisocyanate and thus become embedded in the PU matrix. Reactive flame retardants of this type have a lower tendency to migrate and therefore are superior to the traditional flame retardants like tris(2-chloropropyl) phosphate (TCPP), since these are merely dissolved physically in the foam.

DE 1143 022 B1 describes the preparation of reactive flame retardants on the basis of phosphonic ester derivatives, which are obtained by reaction of hydroxyl-containing primary or secondary amines and/or polyamines with dialkyl phosphites and then optionally oxyalkylated. In these phosphorus-containing olamines, the phosphonic ester group containing the phosphorus is not an internal constituent of the main chain of the olamine component which contains the active hydrogen containing groups. Rather, the phosphonic ester group is linked to the main chain by a side chain.

Similar phosphorus-containing olamines are known for example from U.S. Pat. Nos. 3,076,010 A and 3,235,517 A.

However, for a given equivalents ratio between the active hydrogen containing groups in the olamine or polyol and the isocyanate groups in the polyisocyanate, the mass fraction of the polyisocyanate in the polyurethane increases as the OH number of the polyol component increases. In the case of multiply functional polyol components, moreover, the degree of crosslinking of the polyurethane macromolecules also increases. Both reduces the structural flexibility of the polyurethane molecules and hence has an adverse effect on the foamability as well as the mechanophysical properties of elastic foams. The known phosphorus-containing olamines have a high OH number and so can only be used in rigid or semi-rigid foam systems.

Flexible or semi-flexible foam systems are typically endowed with flame resistance by using reactive oligomeric phosphoric or phosphonic esters as described in EP 0 658 561 A. These oligomeric compounds have a substantially linear construction and therefore have a comparatively low OH number as compared with monomeric reactive flame retardants. However, it is disadvantageous here that, following the integration of the phosphoric esters in the polyurethane matrix, the polymer chain contains PO bonds that are readily cleavable by hydrolysis or by transesterification. Cleavage of these bonds accordingly degrades the integrity of the polymer chain and leads to a gradual degradation of the foam. It is especially the combination of heat and moisture in typical flexible or moulded foam applications such as mattresses which has particularly adverse consequences for foam systems rendered flame resistant with such phosphoric esters.

The chain degradation triggered by hydrolysis of the PO bonds also liberates chain fragments capable of migration, which lead to "fogging" and, in addition, may also be toxicologically concerning, depending on the flame retardant.

It is further disadvantageous that the reactive oligomeric flame retardants do not react in full in the course of the very fast and high-enthalpy polyaddition reaction between the polyol component and the polyisocyanate. Flame retardant molecules capable of migration are accordingly left in the final foam and can lead to the problems described above.

Flexible polyurethane (PU) foams, also called high resilience (HR) foams, having high elasticity and compression load deflection, which are desirable in mattress manufacture for example, are produced using polyether polyols modified with long-chain polyols, and these polyether polyols can be subdivided into three classes of chemistries:
1. styrene-acrylonitrile polyether dispersions (SAN-PE), which are obtained by grafting polyether (PE) with suitable monomers such as styrene and acrylonitrile,
2. polyurea dispersions (PUD), which are obtained by addition reaction of isocyanates and diamines in the presence of PE,
3. polyisocyanate polyaddition (PIPA) polyol dispersions, which are obtained by addition of alkanolamines such as triethanolamine and isocyanates in the presence of polyether.

WO 1992/02567 A1 discloses the preparation of a polymer-modified polyol dispersion wherein olphosphines and olphosphine oxides are reacted with a polyisocyanate in a polyol component. One disadvantage with this, however, is the strong odour of the phosphines/phosphine oxides, which is attributable to the high vapour pressure of these low molecular weight compounds. This also results in elevated VOC values which are very concerning on account of the high toxicological and ecotoxicological potential of these compounds.

The preparation of the olphosphines and olphosphine oxides described in WO 1992/02567 A1 is also very inconvenient and costly. A further disadvantage is that the recited olphosphines and olphosphine oxides form part of the main chain of the polymer-modified polyol. In these compounds, the phosphorus may be further oxidized to the phosphinate, phosphonate or phosphate by loss of the P—C bonds, which leads to chain degradation and hence to the release of migration-capable chain fragments with toxicological potential.

There accordingly continues to be a need for flame-resistant polyol systems for flexible PU foam manufacture which avoid the disadvantages described above.

SUMMARY OF THE INVENTION

By using the present invention, some or all of the difficulties and drawbacks of the prior art can be overcome by a process for preparing a flame-resistant polymer-modified polyol having a solids content of 1 to 65 wt. % wherein (i) at least one polyisocyanate and (ii) an olamine are reacted in (iii) a base polyol having at least two active hydrogen containing groups of which more than 50% are primary active hydrogen containing groups and wherein the olamine has at least one phosphonic ester group attached to a tertiary nitrogen atom and contains at least two hydroxyl groups.

Active hydrogen containing groups can particularly be functional groups that have a deprotonable hydrogen atom bonded to an atom that is not a hydrogen atom, for example oxygen, nitrogen, or sulfur. Examples for active hydrogen containing groups are primary amines ($RNH_2$), secondary amines ($NHR_2$), hydroxyl (OH), and thiol (SH). Active hydrogen containing groups can particularly react with isocyanate groups.

Examples for primary active hydrogen containing groups are primary amines, primary hydroxyl groups, and primary thiol groups.

The invention further provides a polymer-modified polyol obtainable by the aforementioned process.

The invention further provides a process for preparing flame-resistant, optionally foamed polyurethane plastics, in particular flexible foams, by reacting polyisocyanates with the polymer-modified polyols thus obtained, optionally in the presence of water and/or volatile organic substances as blowing agents and also further optionally by co-use of catalysts, foaming auxiliaries and additives, chain-extending and/or crosslinking agents, organic or inorganic filling materials, flame retardants and/or synergists.

The polymer-modified polyols obtained according to the invention are preferably used in the manufacture of flexible polyurethane foams.

The invention rests on the finding that the above-described disadvantages can surprisingly be overcome at least in part by using the unique combination of a polyisocyanate, a base polyol having at least two active hydrogen containing groups of which more than 50% are primary active hydrogen containing groups, and an olamine component, for example, an ethanolamine substituted by diethyl methylenephosphonate, wherein the phosphorus-containing groups are not present within the olamine scaffold containing the active hydrogen containing groups, but are attached to the olamine scaffold by a side chain for the preparation of a polymer-modified polyol with a solid content of 1 to 65 wt %, similar to the preparation of the known PIPA polyol dispersions.

These commercially available, reactive, halogen-free flame retardants based on phosphorus in a high oxidation state will already be familiar to a person skilled in the art from the flame retardation of rigid polyurethane foam systems. Their preparation and use are described for example in DE 11 43 022 B, U.S. Pat. Nos. 3,076,010 A and 3,235,517 A.

The familiar PIPA polyol dispersions, described for example in U.S. Pat. Nos. 4,296,213, 4,452,923, 4,518,778 and 4,554,306, provide a way in the present invention to integrate reactive flame retardants firmly in the polymer scaffold of the solid fraction of the polyol dispersion, in a process step prior to foaming. After the subsequent foaming by reaction of the flame-resistant PIPA polyol dispersion with further polyisocyanate, the flame retardant thus incorporated has undergone at least two polyaddition reactions, substantially raising the overall conversion of the flame retardant and substantially reducing the amount of migration-capable flame retardant in the final foam.

Since the phosphonic ester group of the olamine component attaches via a side chain to the main chain of the olamine scaffold featuring the active hydrogen containing groups, the phosphonic ester group does not become integrated in the polyurethane main chain in the course of the polyaddition reactions either during the preparation of PIPA polyol dispersion or in the course of the final foaming. The result is a higher thermal and oxidative stability as compared with the polyurethane foams of WO 1992/002567 A1, which were obtained using PIPA polyol dispersions based on olphosphines or olphosphine oxides.

Because the phosphonic ester groups are outside the polyurethane main chain, it is also not disadvantageous that the flame retardants used according to the present invention contain phosphorus in higher oxidation states. In contrast to the oligomeric phosphate esters described in EP 0 658 561 A, any hydro- or thermolysis does not lead to chain degradation. On the contrary only an alcohol is formed in the event of a, for example, hydrolytic cleavage of the PO bonds, leaving the integrity of the polyurethane main chain completely intact.

The polyaddition reaction between the flame retardant component and the polyisocyanate in the base polyol may be carried out in one or more successive steps. The overall conversion of the flame retardant component becomes nearly quantitative as a result, as reflected inter alia in very low VOC values.

Flexible polyurethane foams obtained using the polymer-modified polyols of the present invention do not just have the advantages that are already familiar from PIPA polyol dispersions, such as a high compression load deflection combined with low weight. They also do not need additional metering lines in the foaming operation and hence also no additional stocking vessels for the flame retardants.

The polymer-modified polyol of the present invention is at the same time compatible with all common organic and inorganic filling materials used for attaining high compression load deflections and also with further flame retardants in order to meet very high flame resistance requirements. For example, formulating the polymer-modified polyol of the present invention with melamine and foaming up said formulation with polyisocyanate is sufficient to pass flame retardancy tests as per BS 5852 Part 2 Crib Ignition Source V.

DETAILED DESCRIPTION OF THE INVENTION

To prepare a flame-resistant polymer-modified polyol of the present invention, (i) at least one polyisocyanate and (ii) an olamine are reacted in (iii) a base polyol having at least two active hydrogen containing groups of which more than 50% are primary active hydrogen containing groups in a manner similar to the preparation of the known PIPA polyol dispersions. According to the invention, the olamine has at least one phosphonic ester group attached to a tertiary nitrogen atom and contains at least two hydroxyl groups.

The reaction is preferably carried out at a temperature of 30° C. to 170° C.

The polymer-modified polyol dispersion thus obtained has a solids content of 1 to 65 wt. %, preferably of 2 to 50 wt. %, as polymer fraction.

A polyol dispersion having a solids content of 3 to 25 wt. % is particularly preferable and of 5 to 15 wt. % is very particularly preferable. The solid content is preferably based on the total weight of the dispersion. The solid content can be in the form of polyurethane particles, in particular in the form of PIPA particles. The weight of the polyurethane particles, in particular of the PIPA particles, may be a calculated weight determined according to methods known in the art.

The solid content (in wt. %) of the polymer-modified polyol may be calculated by dividing the sum of amounts (wt.) of olamines (including phosphorous-containing olamines, if any), polyisocyanates, and, if present, cross-linking agents, and, if present, other isocyanates (including, but not limited to, e.g. monoisocyanates), by the total amount (wt.) of starting materials and multiplying the result with 100.

The phosphorus-containing olamine used according to the invention may be a polyhydroxy compound as described for example in DE 11 43 022 B. These compounds are obtainable by condensation of hydroxyl-containing primary or secondary aliphatic, cycloaliphatic, aromatic, araliphatic or heterocyclic mono- and/or polyamines with carbonyl compounds and dialkyl phosphites with or without subsequent oxyalkylation.

The phosphorus-containing olamine preferably conforms to the following general formula (I):

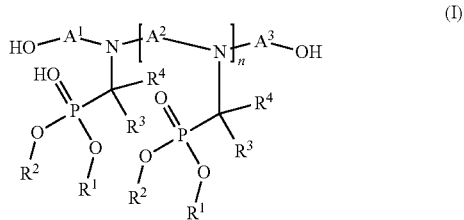

(I)

where $R^1$ and $R^2$ are each independently an alkyl moiety of 1 to 18 carbon atoms, $R^3$ and $R^4$ are hydrogen atoms or any desired hydrocarbon moieties and $A^1$ and also $A^3$ are identical or different moieties of the formulae

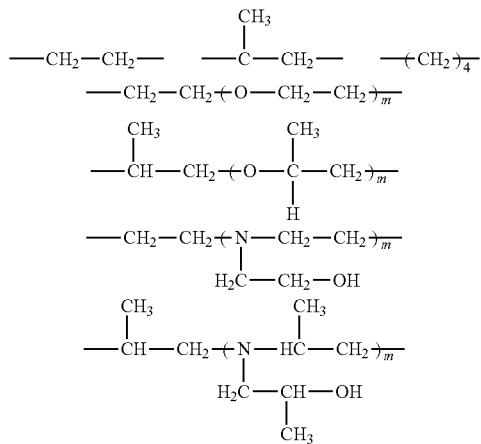

where m is an integer from 1 to 10, and $A^2$ is an alkylene or aralkylene moiety of 2 to 12 carbon atoms, an arylene moiety or an $A^1$ or $A^3$ moiety, and n is an integer from 0 to 10.

It is particularly preferable for the phosphorus-containing olamine to conform to the following general formula (II):

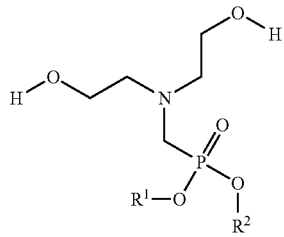

(II)

where $R^1$ and $R^2$ are the same or different and are each independently alkyl of 1 to 18 carbon atoms, preferably 1 to 4 carbon atoms, aryl or aralkyl.

Very particularly preferred is diethyl N,N-bis(hydroxyethyl)aminomethylphosphonate; (CAS: 2781-11-5), which is marketed by PCC-Rokita under the name Roflam® 6.

The phosphorus-containing olamine used according to the invention may be present in the reaction mixture in an amount of from 1 to 25 g/100 g flame-resistant polymer-modified polyol, preferably from 3 to 22 g/100 g flame-resistant polymer-modified polyol, more preferably from 5 to 20 g/100 g flame-resistant polymer-modified polyol, even more preferably from 7 to 17 g/100 g flame-resistant polymer-modified polyol.

The reaction with the phosphorus-containing olamines (ii) and the base polyol components (iii) to obtain the polyol dispersions of the present invention and the conversion thereof into polyurethane plastics may utilize not only monoisocyanates, such as phenyl isocyanate or stearyl isocyanate, but also aliphatic, cycloaliphatic, araliphatic, aromatic and heterocyclic polyisocyanates having at least two NCO groups, described for example by W. Siefken in Justus Liebigs Annalen der Chemie, 562 (1949), pages 75-136.

Useful polyisocyanates include, for example, ethylene diisocyanate, 1,4-tetramethylene diisocyanate, 1,6-hexamethylene diisocyanate, 1,12-dodecane diisocyanate, cyclobutane 1,3-diisocyanate, cyclohexane 1,3-diisocyanate, cyclohexane 1,4-diisocyanate and also any desired mixtures of these isomers, 1-isocyanato-3,3,5-trimethyl-5-isocyanatomethylcyclohexane, 2,4- and/or 2,6-hexahydrotolylene diisocyanate and also any desired mixtures of these isomers, hexahydro-1,3- and/or -1,4-phenylene diisocyanate, perhydro-2,4'- and/or -4,4'-diphenylmethane diisocyanate, 1,3- and/or 1,4-phenylene diisocyanate, 2,4- and/or 2,6-tolylene diisocyanate and also any desired mixtures of these isomers, diphenylmethane 2,4'- and/or 4,4'-diisocyanate, naphthylene 1,5-diisocyanate, triphenylmethane 4,4', 4"-triisocyanate.

Suitable polyisocyanates further include polyphenyl polymethylene polyisocyanates of the type obtainable by aniline-formaldehyde condensation and subsequent phosgenation.

Further examples are polyisocyanates comprising carbodiimide groups, polyisocyanates comprising allophanate groups, polyisocyanates comprising urethane groups, polyisocyanates comprising acylated urea groups, polyisocyanates comprising biuret groups, polyisocyanates obtained by telomerisation reactions, polyisocyanates comprising ester groups and reaction products of the abovementioned isocyanates with acetals.

Suitable diisocyanates include not only aliphatic diisocyanates, such as hexamethylene diisocyanate and tetramethylene diisocyanate, but also cycloaliphatic diisocyanates such as, for example, hexahydro-p-phenylene diisocyanate, and especially aromatic diisocyanates such as, for example, tolylene diisocyanate, 4,4'-diphenylmethane diisocyanate, 1,5-naphthylene diisocyanate and p-phenylene diisocyanate.

Particular preference is generally given to the industrially readily accessible polyisocyanates such as 2,4- and/or 2,6- tolylene diisocyanate and any desired mixtures of these isomers ("TDI"), polyphenyl polymethylene polyisocyanates of the type obtainable by aniline-formaldehyde condensation and subsequent phosgenation ("crude MDI") and polyisocyanates comprising carbodiimide groups, urethane groups, allophanate groups, isocyanurate groups, urea groups or biuret groups ("modified polyisocyanates").

The polyisocyanate may be used singly or in admixture with other polyisocyanates. The polyisocyanate may further be in a mixture with up to 40 mol % of a monoisocyanate.

The polyisocyanate used according to the invention may be present in the reaction mixture in an amount of from 1 to 20 g/100 g flame-resistant polymer-modified polyol, preferably from 2 to 18 g/100 g flame-resistant polymer-modified polyol, more preferably from 3 to 15 g/100 g flame-resistant polymer-modified polyol, even more preferably from 4 to 14 g/100 g flame-resistant polymer-modified polyol.

The equivalents ratio NCO:OH between the OH groups of the phosphorus-containing olamine (ii) and the NCO groups of the at least one polyisocyanate (i) and also optionally of the monoisocyanate is preferably in the range from 0.5 to 1.5.

The equivalents ratio NCO:OH is more preferably in the range from 0.85 to 1.2 and even more preferably in the range from 0.9 to 1.15.

The base polyol (iii) used for preparing the polymer-modified polyol dispersion of the present invention has at least two active hydrogen containing groups of which more than 50% are primary active hydrogen containing groups and preferably a weight average molecular weight Mw in the range from 2000 g/mol to 15000 g/mol.

The weight average molecular weight Mw of the base polyol is more preferably in the range from 2500 to 12000 and yet more preferably in the range from 3000 to 7000 g/mol.

It is particularly preferable for the base polyol to be a polyether polyol (poly(oxyalkylene) polyol) having an OH functionality in the range from 2 to 8 and a weight average molecular weight of Mw=2000 to 15 000 g/mol.

If desired, mixtures of two or more polyols are also usable as base polyol.

The base polyol may be in the form of a homopolymer, a copolymer or block copolymer.

The poly(oxyalkylene) polyols used with preference are commercially available or are obtainable in a conventional manner by polyaddition of alkylene oxides such as ethylene oxide, propylene oxide, butylene oxide and styrene oxide, optionally mixed or in succession onto polyfunctional starting compounds. The choice of alkylene oxide can influence the presence of primary or secondary hydroxyl groups in the resulting polyether polyol as is known in the art.

Examples of preferred starter compounds are water, alcohols or amines but especially molecules having two to six primary or secondary amine groups or hydroxyl groups per molecule such as triethanolamine, 1,2-ethanediol, 1,2-propanediol, 1,3-propanediol, diethylene glycol, dipropylene glycol, triethylene glycol, tripropylene glycol, 1,2-butanediol, 1,3-butanediol, 1,4-butanediol, 1,2-hexanediol, 1,4-hexanediol, 1,5-hexanediol, 1,6-hexanediol, glycerol, trimethylolpropane, pentaerythritol, mannitol or sorbitol, 4,4'-dihydroxy-diphenylpropane, aniline, mono- and diethanolamine, ethylenediamine and diethylenetriamine. Sucrose polyethers and also formitol- or formose-started polyethers also come into consideration for the purposes of the present invention. The choice of starter molecule can influence the functionality of the resulting polyether polyol as is known in the art.

For the base polyol, particular preference is given to such polyethers where the predominant proportion, preferably more than 50%, more preferably more than 70%, even more preferably up to 85%, of all the OH groups present in the polyether are primary OH groups. Polybutadienes comprising OH groups or hydroxyl-functional polymers of tetrahydrofuran are also suitable for the purposes of the present invention.

Suitable base polyols for the applications in flexible foams preferably have a hydroxyl number of 20 to 100 mg/KOH and/or a dynamic viscosity in the range from 400 to 6000 mPa·s.

The base polyol used according to the invention may be present in the reaction mixture in an amount from 35 to 99 g/100 g flame-resistant polymer-modified polyol, preferably from 50 to 95 g/100 g flame-resistant polymer-modified polyol, more preferably from 60 to 95 g/100 g flame-resistant polymer-modified polyol, even more preferably from 65 to 90 g/100 g flame-resistant polymer-modified polyol.

According to an embodiment of the invention, the reaction is carried out in the presence of a cross-linking agent having a weight average molecular weight from 200 to 1000 g/mol. Conducting the reaction in the presence of a cross-linking agent with a weight average molecular weight in the above range can help to obtain polymer-modified polyols that yield flexible foams with improved mechanical properties. Without wishing to be bound by theory, it is believed that the use of a cross-linking agent as described herein improves the miscibility and/or the compatibility in the resulting polymer-modified polyol.

Preferably, the cross-linking agent may have a weight average molecular weight from 400 to 900 g/mol and more preferably from 500 to 800 g/mol.

According to another embodiment of the invention, the cross-linking agent has a functionality of 2 to 8, in particular 3 to 6, active hydrogen containing groups, capable of reacting with isocyanate functions. It has been found that a functionality of the cross-linking agent in this range yields a polymer-modified polyol that can be used to prepare flexible foams with good mechanical properties.

The functionality can in particular mean the number of functional groups, in particular the number of a specific functional group, in a molecule. For example, a cross-linking agent with a functionality of 2 to 8 active hydrogen containing groups can be a cross-linking agent in which each molecule of the cross-linking agent has 2 to 8 active hydrogen containing groups.

According to another embodiment of the invention, the cross-linking agent contains hydroxyl functions. Cross-linking agents with hydroxyl groups have been found to yield polymer-modified polyols with very good properties for flexible foams.

According to another embodiment of the invention, the cross-linking agent is a polyether polyol. Polyether polyol cross-linking agents have been found to be particularly beneficial for the compatibility and the miscibility of the resulting polymer-modified polyol.

Advantageously, the cross-linking agent, when used, is present in the reaction in an amount of from 0.1 to 11 g/100 g flame-resistant polymer-modified polyol, in particular from 0.2 to 7 g/100 g flame-resistant polymer-modified polyol, more particularly from 0.5 to 6 g/100 g flame-resistant polymer-modified polyol. Practical experiments have shown that the use of more than substantially 11 g cross-linking agent per 100 g flame-resistant polymer-modified polyol resulted in polymer-modified polyols that yielded foams with bad properties, in particular a bad resilience and a high rigidity. On the other hand, it has been found that the use of less than 0.1 g cross-linking agent per 100 g flame-resistant polymer-modified polyol did not have any effect on the properties of foams prepared from the resulting flame-resistant polymer-modified polyols.

The details mentioned above for the preparation, the functionality, and/or the type of hydroxyl groups (that is, primary or secondary hydroxyl groups) of the base polyol preferably also apply for the cross-linking agent.

The reaction of the polyisocyanate (i) with the phosphorus-containing olamine (ii) in the base polyol (iii) may be carried out in the presence of water at not more than 0.25 wt. % and/or low molecular weight hydroxyl- or amino-containing compounds having a molecular weight of below 400 g/mol at not more than 5 wt. % and/or catalysts and/or further flame retardants and/or synergists, and/or organic and inorganic fillers and/or further auxiliaries.

By way of low molecular weight hydroxy compounds there may be used ethylene glycol, 1,2-propylene glycol, 1,3-propylene glycol, 1,4-butylene glycol, 2,3-butylene glycol, 1,6-hexanediol, 1,8-octanediol, neopentyl glycol, 1,4-bis-hydroxymethylcyclohexane, 2-methyl-1,3-propanediol, glycerol, trimethylolpropane, 1,2,6-hexanetriol, 1,2,4-butanetriol, trimethylolpropane, pentaerythritol, quinitol, mannitol and sorbitol, formitol, methylglycoside, diethylene glycol, triethylene glycol, tetraethylene glycol and higher polyethylene glycols, dipropylene glycol and higher polypropylene glycols and also dibutylene glycol and higher polybutylene glycols at a maximum molecular weight of 400 g/mol.

Examples of suitable low molecular weight amines are ethylenediamine, diethylenetriamine, N,N-dimethylethylenediamine, piperazine, 4-aminobenzylamine, 4-aminophenylethylamine, o-, m- and p-phenylenediamine, 2,4- and/or 2,6-tolylenediamine, 4,4'-diaminodiphenylmethane and/or olamines such as ethanolamine, di- and triethanolamine, propanolamine, di- and tripropanolamine, butanolamine and di- and tributanolamine.

Suitable catalysts are organometallic compounds such as dibutyltin oxide and dibutyltin dichloride and/or catalysts based on Sn(+II), Sn(+IV), Bi(+III), Zn(+II) or Zr(+IV) salts of carboxylic acids such as tin(II) acetate, tin(II) octoate, tin(II) ethylhexoate, tin(II) laurate, tin(II) palmitate, tin(II) stearate, tin(II) oleate, dibutyltin diacetate, dibutyltin dilaurate, dibutyltin maleate, dioctyltin diacetate, bismuth(III) neodecanoate, zinc(II) octoate, zinc(II) ricinoleate, zinc(II) neodecanoate and zirconium(IV) ethylhexoate.

The catalyst used according to the invention may be present in the reaction mixture in an amount of from 0.01 to 1.5 g/100 g flame-resistant polymer-modified polyol, preferably from 0.03 to 1 g/100 g flame-resistant polymer-modified polyol, more preferably from 0.05 to 0.5 g/100 g flame-resistant polymer-modified polyol, even more preferably from 0.08 to 0.2 g/100 g flame-resistant polymer-modified polyol.

As supplementary, preferably halogen-free flame retardants there may be used phosphorus compounds such as tert-butylphenyl diphenyl phosphate, isopropylphenyl diphenyl phosphate, tricresyl phosphate and dimethyl methanephosphonate and/or nitrogen compounds such as melamine, in each case alone or combined with further synergists such as zinc borate, and zinc stannate.

It is additionally possible to use known organic and/or inorganic filling materials such as $CaCO_3$ and also further auxiliaries such as emulsifiers, colour pastes and stabilizers.

The process which the present invention provides for preparing the polymer-modified polyol by reacting the at least one polyisocyanate (i) with the phosphorus-containing olamines (ii), which have phosphonic ester groups attached to tertiary nitrogen atoms and at least two hydroxyl groups, in base polyol (iii) may be carried out in a batch operation or in a continuous operation.

In the batch operation, the base polyol may be initially charged together with the phosphorus-containing olamine at temperatures between 10° C. and 100° C. and the polyisocyanate added. It is also possible to initially charge the base polyol only and to add the phosphorus-containing olamine and also the polyisocyanates into the base polyol in synchronous fashion, in which case the heat of reaction is optionally removed by cooling in both scenarios.

However, a continuous or semi-continuous procedure is advantageous where the mixing of the polyisocyanate with the phosphorus-containing olamine and the polyether polyols is effected synchronously, for example in a fast-rotating mixing head, and the more or less converted reaction mixture, depending on the average residence time in the mixing head, is transferred into a stirred tank or agitated stock reservoir tank for further reaction. In this form of reaction management, the reaction mixture may also undergo subsequent reaction in two or more stirred tanks serially connected in the form of a cascade, at temperatures between 50° C.-150° C., in which case the heat of reaction is optionally removed by cooling in either scenario.

It is preferable to maintain an equivalents ratio of NCO:OH groups between 0.85 and 1.20, yet more preferably between 0.95 and 1.10.

The concentration of the solid polyaddition products in the polyether polyols may be adjusted to values between 1 and 65 wt. % in the final polyol dispersion. However, preference is given to a solids content between 3 and 25 wt. %, very particularly between 5 and 15 wt. %.

The polymer-modified polyols according to the invention can also be prepared using a seeding process. When using a seeding process, a polymer-modified polyol with a low solid content, for example from 0.01 to 5 wt. %, based on the amount of polymer-modified polyol, is used as the base polyol and further polyisocyanate as well as olamine and optionally cross-linking agent and optionally catalyst are added. In this mixture, the solid content already present in the mixture in the form of polymer particles act as nuclei that grow as the reaction proceeds. In this way, the solid content can be easily adjusted to the desired value. Further, it is also possible to conduct an "in situ seeding", wherein a first amount of the polyisocyanate is added to the mixture of base polyol and optionally a catalyst followed by addition of the olamine with at least one phosphonic ester group attached to a tertiary nitrogen atom and at least two hydroxyl groups, in a second step. The reaction can then be allowed to react before in a third step, a second amount of polyisocyanate is added. Using either of the seeding processes, bimodal particle distributions can be obtained. This can help to tailor the properties of the resulting plastics, in particular the foams.

The amount of dispersed polyaddition product required for foams to have optimum physicomechanical as well as flame-retardant properties is from 5 to 15 wt. %. It will be appreciated that such dispersions of low solids content are obtainable directly according to the present invention. However, a multi-step procedure is preferred where a dispersion having a high solids content between 25 and 65 wt. % is prepared in the first step and is then adjusted to the desired solids concentration with any desired polyol, for example the polyether polyol already used in the first step, some other of the polyether polyols mentioned above, a polyester polyol, a further polyol dispersion such as, for example, a further polyisocyanate polyaddition polyol dispersion (PIPA) prepared with an olamine in a conventional manner and/or a styrene-acrylonitrile polyether dispersion (SAN-PE) and/or polyurea dispersion (PUD) or mixtures of all the polyols referred to here. This is a simple way to expand the property profiles of the polymer-modified polyol dispersions of the present invention.

The polymer-modified polyol dispersions of the present invention are advantageously processible into flexible polyurethane foams having improved properties, such as enhanced tensile strength and hardness. The dispersions are likewise useful for producing elastomers, coatings and overcoatings. To this end, the polymer-modified polyol dispersions of the present invention are reacted, optionally in the presence of other customary polyols, with aliphatic, cycloaliphatic, araliphatic, aromatic and heterocyclic polyisocyanates, optionally in the presence of known auxiliaries and additives.

Known auxiliaries and additives are, in particular, water and/or volatile organic substances as blowing agents which may optionally be used together with catalysts, foaming auxiliaries and additives, chain-extending and/or crosslinking agents, organic or inorganic filling materials, flame retardants and/or synergists.

This provides flame-resistant, optionally foamed polyurethane plastics, in particular flexible foams, having good mechanical and physical properties, thermal and hydrolytic stability and no components with a tendency to migrate.

EXAMPLES

I) Flame Resistant (FR) Polyol Synthesis
Apparatuses Used:

| | |
|---|---|
| T 50 ULTRA-TURRAX ® | High-performance dispersing instrument. |
| Hennecke Labfoam ® | Semi continuous operating laboratory plant for test series and laboratory purposes. |

Chemicals Used:

| | |
|---|---|
| Polyol A | Glycerin started polyoxypropylene polyol capped with ethylene oxide with a functionality of approximately 3, and LOH of 33-38 mg KOH/g and a weight average molecular weight of Mw = 4800 g/mol. |
| Polyol B | Reactive polymer modified polyol with a solid content of 10%, a functionality of approximately 3, and LOH of 47-52 mg KOH/g and a weight average molecular weight of Mw = 4850 g/mol. |
| Polyol C | Reactive polymer modified polyol with a solid content of 20%, a functionality of approximately 3, and LOH of 50-57 mg KOH/g and a weight average molecular weight of Mw = 4850 g/mol. |
| Polyol D | Reactive styrene-acrylonitrile copolymer modified polyol with a solid content of 40%, a functionality of approximate 3, and LOH of 20-23 mgKOH/g and a weight average molecular weight of Mw = 4800 g/mol. |
| Polyol E | Polyoxyalkylene triol with a weight average molecular weight of Mw = 3000 g/mol and an LOH of 53-59 mg KOH/g. |
| Crosslinker A | Sorbitol started polyoxyalkylene polyol with a LOH of 400-440 mg KOH/g and a weight average molecular weight of Mw = 600. |
| FR olamine | Diethyl N,N-bis(hydroxyethyl)aminomethyl-phosphonate (CAS: 2781-11-5); with a functionality of approximately 2, and LOH of app. 450 mg KOH/g |
| Triethanolamine (TEA) | Tris(2-hydroxyethyl)amine (CAS: 102-71-6) |
| Ongronat ®1080 | Toluenediisocyanate (TDI) - mixture consisting of 80 wt. % 2,4-und 20 wt. % 2,6-isomer (CAS 584-84-9) |
| Kosmos ® 19 | Gelling catalyst (Dibutyltindilaurate (DBTDL), Evonik) |
| Kosmos ® 54 | Gelling catalyst (Zinc ricinoleate, Evonik) |
| Bicat 4130M | Gelling catalyst (Zirconium neodecanoat mixture, Shepherd) |
| Bicat ZM | Gelling catalyst (Zinc dineodecanoate, Shepherd). |

Chemical Physical Properties of the Polyols Listed were Determined in Accordance with Following Standards, Internal Audit Procedures and Measurement Methods:

TABLE 1

| | | |
|---|---|---|
| Water Content | in wt. % | DIN 51777 |
| Hydroxyl Number (LOH) | in mg KOH/g | DIN 53240 |
| Acid Number | in mg KOH/g | DIN EN ISO 3682 |
| Dynamic Viscosity (25° C.) | in mPa · s | DIN 51 550 |
| Color (Pt/Co) | in Hazen | DIN ISO 6271 |

The solid content (in wt. %) of the polymer-modified polyol was calculated by dividing the sum of amounts (wt.) of olamines (including phosphorous-containing olamines, if any), organic polyisocyanates, and, if present, crosslinking agents, and, if present, other isocyanates (including, but not limited to, e.g. monoisocyanates), by the total amount (wt.) of starting materials and multiplying the result with 100.

Example No. 1-11

General Procedure for Manufacturing of 10 kg FR-Polyol:

The base polyol is transferred together with the FR olamine and the gelling catalyst in a dried 15l glass reactor, equipped with a stirrer, a dispersing device (Ultraturrax T50), a thermometer and a dropping funnel. After exclusion of air and moisture by purging with nitrogen, the reaction mass is thoroughly mixed for 10 minutes whereby the temperature increases to 35-45° C.

Then the Ongronat® 1080 is added slowly during a period 30 minutes and the temperature rises to 55-75° C. while the reaction mixture starts immediately to whiten. The resulting polyol dispersion is then slowly stirred for another two hours and finally stored for 24 hours with exclusion of air and moisture.

Example No. 1a-1d

FR-Polyols with Different Molar Ratios (equivalents ratios) NCO:OH

TABLE 2

| Example No. | 1a | 1b | 1c | 1d |
|---|---|---|---|---|
| Polyol A [g] | 8419.71 | 8352.71 | 8285.72 | 8218.72 |
| Fr olamine [g] | 1000.00 | 1000.00 | 1000.00 | 1000.00 |
| Kosmos ® 19 [g] | 10.84 | 10.84 | 10.84 | 10.84 |
| Ongronat ®1080 [g] | 569.45 | 636.45 | 703.44 | 770.44 |
| Molar Ratio NCO:OH | 0.85 | 0.95 | 1.05 | 1.15 |
| T50 mixing [rpm] | 5000 | 5000 | 5000 | 5000 |

TABLE 2-continued

| Example No. | 1a | 1b | 1c | 1d |
|---|---|---|---|---|
| Solid Content [wt. %] | 15.7 | 16.4 | 17.0 | 17.7 |
| P - Content [wt. %] | 1.21 | 1.21 | 1.21 | 1.21 |
| N - Content [wt. %] | 1.54 | 1.65 | 1.75 | 1.86 |
| Dynamic Viscosity [mPa · s] | 2097 | 2774 | 3786 | 9436 |
| LOH [mgKOH/g] | 36.6 | 34.8 | 30.4 | 25.6 |

Example No. 2a-2d

FR Polyols with Different Solid Contents:

TABLE 3

| Example No. | 2a | 2b | 2c | 2d |
|---|---|---|---|---|
| Polyol A [g] | 8806.13 | 8299.12 | 7623.10 | 7285.09 |
| FR olamine [g] | 700.00 | 1000.00 | 1400.00 | 1600.00 |
| Kosmos ® 19 [g] | 10.84 | 10.84 | 10.84 | 10.84 |
| Ongronat ®1080 [g] | 483.03 | 690.04 | 966.06 | 1104.07 |
| Molar Ratio NCO:OH | 1.03 | 1.03 | 1.03 | 1.03 |
| T50 mixing [rpm] | 5000 | 5000 | 5000 | 5000 |
| Solid Content [wt. %] | 11.8 | 16.9 | 23.7 | 27.0 |
| P - Content [wt. %] | 0.85 | 1.21 | 1.70 | 1.94 |
| N - Content [wt. %] | 1.21 | 1.73 | 2.43 | 2.77 |
| Dynamic Viscosity [mPa · s] | 2795 | 3341 | 5225 | 6563 |
| LOH [mgKOH/g] | 32.8 | 30.7 | 30.4 | 28.5 |

Example No. 3a-3d FR Polyols, Prepared with Different Gelling Catalysts

TABLE 4

| Example No. | 3a | 3b | 3c | 3d |
|---|---|---|---|---|
| Polyol A [g] | 8489.12 | 8489.12 | 8489.12 | 8489.12 |
| FR olamine [g] | 887.57 | 887.57 | 887.57 | 887.57 |
| Kosmos ® 19 [g] | 10.84 | 0.00 | 0.00 | 0.00 |
| Kosmos ® 54 [g] | 0.00 | 10.84 | 0.00 | 0.00 |
| Bicat ® 4130 M [g] | 0.00 | 0.00 | 10.84 | 0.00 |
| Bicat ® ZM [g] | 0.00 | 0.00 | 0.00 | 10.84 |
| Ongronat ®1080 [g] | 612.47 | 612.47 | 612.47 | 612.47 |
| Molar Ratio NCO:OH | 1.03 | 1.03 | 1.03 | 1.03 |
| T50 mixing [rpm] | 5000 | 5000 | 5000 | 5000 |
| Solid Content [wt. %] | 15.0 | 15.0 | 15.0 | 15.0 |
| P - Content [wt. %] | 1.08 | 1.08 | 1.08 | 1.08 |
| N - Content [wt. %] | 1.54 | 1.54 | 1.54 | 1.54 |

TABLE 4-continued

| Example No. | 3a | 3b | 3c | 3d |
|---|---|---|---|---|
| Dyn. Viscosity [mPa · s] | 3065 | 4652 | 5225 | 3057 |
| LOH [mgKOH/g] | 32.8 | 30.7 | 30.4 | 34.3 |

The Zn(II)neodecanoate catalyst Bicat® ZM exhibits comparable performance regarding viscosity and stability of the resulting dispersions to the DBTDL catalyst Kosmos® 19.

Example No. 4a-5c

General Procedure for Manufacturing of 10 kg FR-Polyol with In Situ Seeding (TEA):

The base polyol is transferred together with the olamine (TEA) and the gelling catalyst in a dried 15 l glass reactor, equipped with a stirrer, a dispersing device (Ultraturrax T50), a thermometer and a dropping funnel. After exclusion of air and moisture by purging with nitrogen, the reaction mass is thoroughly mixed for 10 minutes whereby the temperature increases to 35-45° C.

Then the first amount of Ongronat® 1080 is added slowly during a period of 10 minutes. The reaction mixture is thoroughly mixed for 10 minutes, then the FR olamine is added and mixing proceeds for another 10 minutes. The remaining amount of Ongronat® 1080 is added slowly during a period of 10 minutes and the temperature rises to 55-75° C. while the reaction mixture starts immediately to whiten. The resulting polyol dispersion is then slowly stirred for another two hours and finally stored for 24 hours with exclusion of air and moisture.

TABLE 5

| Example No. | 4a | 4b | 4c | 5a | 5b | 5c |
|---|---|---|---|---|---|---|
| Polyol A [g] | 8796.12 | 8289.10 | 7275.08 | 8786.10 | 8279.09 | 7265.06 |
| Triethanolamin [g] | 3.57 | 3.57 | 3.57 | 7.14 | 7.14 | 7.14 |
| Ongronat ®1080 1st [g] | 6.44 | 6.44 | 6.44 | 12.88 | 12.88 | 12.88 |
| FR olamine [g] | 700.00 | 1000.00 | 1600.00 | 700.00 | 1000.00 | 1600.00 |
| Ongronat ®1080 2nd [g] | 483.03 | 690.04 | 1104.07 | 483.03 | 690.04 | 1104.07 |
| Kosmos ® 19 [g] | 10.84 | 10.84 | 10.84 | 10.84 | 10.84 | 10.84 |
| Molar Ratio NCO:OH | 1.03 | 1.03 | 1.03 | 1.03 | 1.03 | 1.03 |
| T50 mixing [rpm] | 5000 | 5000 | 5000 | 5000 | 5000 | 5000 |
| Solid Content [wt. %] | 11.9 | 17.0 | 27.1 | 12.0 | 17.1 | 27.2 |
| P - Content [wt. %] | 0.85 | 1.21 | 1.94 | 0.85 | 1.21 | 1.94 |
| N - Content [wt. %] | 1.21 | 1.73 | 2.77 | 1.21 | 1.73 | 2.77 |
| Dynamic Viscosity [mPa · s] | 2795 | 3341 | 6563 | 2648 | 3522 | 4945 |
| LOH [mgKOH/g] | 32.8 | 30.7 | 28.5 | 31.9 | 32.6 | 29.4 |

Example No. 6a-7c

General Procedure for Manufacturing of 10 kg FR-Polyol with Seeding:

The polyol components consisting of the base polyol and the seeding polyol are transferred together with the FR olamine and the gelling catalyst in a dried 15 l glass reactor, equipped with a stirrer, a dispersing device (Ultraturrax T50), a thermometer and a dropping funnel. After exclusion of air and moisture by purging with nitrogen, the reaction mass is thoroughly mixed for 10 minutes whereby the temperature increases to 35-45° C. Then the Ongronat® 1080 is added slowly during a period 30 minutes and the temperature rises to 55-75° C. while the reaction mixture starts immediately to whiten. The resulting polyol dispersion is then slowly stirred for another two hours and finally stored for 24 hours with exclusion of air and moisture.

TABLE 6

| Example No. | 6a | 6b | 6c | 7a | 7b | 7c |
|---|---|---|---|---|---|---|
| Polyol A [g] | 7291.79 | 7191.79 | 7091.79 | 8176.75 | 8076.75 | 7976.75 |
| Polyol B [g] | 100.00 | 200.00 | 300.00 | 100.00 | 200.00 | 300.00 |
| FR olamine [g] | 1600.00 | 1600.00 | 1600.00 | 1000.00 | 1000.00 | 1000.00 |
| Ongronat ® 1080 [g] | 997.37 | 997.37 | 997.37 | 712.41 | 712.41 | 712.41 |
| Kosmos ® 19 [g] | 10.84 | 10.84 | 10.84 | 10.84 | 10.84 | 10.84 |
| Molar Ratio NCO:OH | 1.03 | 1.03 | 1.03 | 1.03 | 1.03 | 1.03 |
| T50 mixing [rpm] | 5000 | 5000 | 5000 | 5000 | 5000 | 5000 |
| Solid Content [wt. %] | 26.07 | 26.17 | 26.27 | 17.22 | 17.32 | 17.42 |
| P - Content [wt. %] | 1.93 | 1.93 | 1.93 | 1.93 | 1.93 | 1.93 |
| N - Content [wt. %] | 2.37 | 2.37 | 2.37 | 2.37 | 2.37 | 2.37 |
| Dynamic Viscosity [mPa · s] | 5675 | 4587 | 4997 | 2950 | 3602 | 3381 |
| LOH [mgKOH/g] | 33.70 | 34.20 | 32.90 | 35.40 | 33.90 | 31.20 |

Example No. 8-11

Discontinuous Preparation of FR Polyol with a High Solid Content in Terms of a Master Batch and Subsequent Dilution with Different Polymer Modified and Standard Poylols:

First, a FR Polyol with a final solid content of 27% and containing 16% FR olamine is prepared according to the general procedure without seeding described above. This FR polyol is then blended before the final 24 hour storage, with a second polyol and intensely mixed for 10 minutes. The resulting polyol dispersion is then slowly stirred for another two hours and finally stored for 24 hours with exclusion of air and moisture.

TABLE 7

| Example No. | 8 | 9 | 10 | 11 | 12 |
|---|---|---|---|---|---|
| Polyol A [g] | 6223.79 | 6223.79 | 6223.79 | 6223.79 | 5169.30 |
| Polyol B [g] | 62.50 | 62.50 | 62.50 | 62.50 | 43.75 |
| FR olamine [g] | 1000.00 | 1000.00 | 1000.00 | 1000.00 | 700.00 |
| Ongronat ® 1080 [g] | 623.75 | 623.75 | 623.75 | 623.75 | 436.63 |
| Kosmos ® 19 [g] | 6.78 | 6.78 | 6.78 | 6.78 | 4.74 |
| Polyols used for blending | | | | | |
| Polyol A [g] | 2083.19 | 0.00 | 0.00 | 0.00 | 0.00 |
| Polyol B [g] | 0.00 | 2083.19 | 0.00 | 0.00 | 0.00 |
| Polyol C [g] | 0.00 | 0.00 | 2083.19 | 0.00 | 0.00 |
| Polyol D [g] | 0.00 | 0.00 | 0.00 | 2083.19 | 0.00 |
| Polyol E [g] | 0.00 | 0.00 | 0.00 | 0.00 | 3645.58 |
| Molar Ratio NCO:OH | 1.03 | 1.03 | 1.03 | 1.03 | 1.03 |
| T50 mixing [rpm] | 5000.00 | 5000.00 | 5000.00 | 5000.00 | 5000.00 |
| Solid Content [wt. %] | 16.30 | 18.38 | 20.47 | 24.63 | 11.41 |
| Dynamic Viscosity [mPa · s] | 2847 | 3226 | 3845 | 4775 | 5631 |
| LOH [mgKOH/g] | 39.90 | 44.20 | 41.70 | 45.40 | 39.50 |

Example No. 13a-c

Continuous Preparation of FR Polyol, also in the Presence of a Crosslinker:

Polyol A, Polyol B, the crosslinking agent, and FR olamine are fed simultaneously via a mixing head together with the gelling catalyst at ambient temperature to a post reaction vessel, equipped with a stirrer under exclusion of air and moisture under a nitrogen blanket, where the reaction mass is slowly stirred for further 48 hours with exclusion of air and moisture.

TABLE 8

| Example No. | 13a | 13b | 13c |
|---|---|---|---|
| Polyol A [kg/min] | 80.47 | 69.69 | 78.49 |
| Crosslinker A [kg/min] | 0 | 0 | 1.89 |
| Polyol B [kg/min] | 1.64 | 1.42 | 1.64 |
| FR olamine [kg/min] | 10 | 16 | 10 |
| Ongronat ® 1080 [kg/min] | 6.2 | 10.18 | 7.37 |
| Kosmos ® 19 [g/min] | 67.6 | 108.4 | 67.6 |
| Molar Ratio NCO:OH | 0.95 | 0.95 | 0.95 |
| Solid Content [wt. %] | 19.5 | 30.3 | 22.6 |
| Dynamic Viscosity [mPa · s] | 3912 | 9874 | 3553 |
| LOH [mgKOH/g] | 37.3 | 34.8 | 35 |

II) Foam Preparation

Apparatuses Used:

| | |
|---|---|
| Hennecke Labfoam ® | Semi continuous operating laboratory plant for test series and laboratory purposes. |
| Pendraulik ®31832 | Laboratory mixer for application of high shear forces |
| Foamat ® | Foam rise height measurement testing device for determination of rise profiles |
| Zwick Roell ®Z010 | Static materials testing machines for determination of foam hardness, foam density and SAG factor |

Chemicals Used:

| | |
|---|---|
| Water | Chemical blowing agent. |
| DEOA 90% | 90% solution of diethanolamine in water. |
| ORTEGOL ® 204 | Crosslinker with a delayed reaction (Evonik). |
| B 8783 LF2 | Surfactant - efficient HR silicone (Evonik). |
| DABCO BLV | Amine catalyst (Air products). |
| Niax A1 | Amine Catalyst (Momentive). |
| KOSMOS ® 29 | Gelling catalyst (stannous octoate, Evonik). |
| Niax A300 | Reactive amine catalyst (Momentive). |
| Niax A400 | Reactive amine catalyst (Momentive). |
| Niax A-33 | Amine catalyst (Momentive). |
| Niax L-3002 | Silicone Surfactant (Momentive). |
| Ongronat ®1080 | Toluenediisocyanate (TDI) - mixture consisting of 80% wt 2,4- and 20% wt 2,6-Isomer (CAS 584-84-9). |
| Ongronat ® TR 4040 | 2,2'/2,4' and 4,4'-Methylene diphenyl diisocyanate. MDI is an aromatic isocyanate. |

Physical Mechanical Properties:

The physical mechanical properties and the flame retardance of the foam samples listed were determined in accordance with the following standards, internal audit procedures and measurement methods:

TABLE 9

| | | |
|---|---|---|
| Hardness | in kPa | DIN EN ISO 3386-1 |
| Air Flow | in L/sec | DIN EN ISO 7231 |
| Resilience | in % | DIN EN ISO 8307 |
| SAG-Factor | | ASTM D-1564-64T |
| Compression Set (22 h, 70° C., 50%) (CS dry, 50%) | in % | DIN EN ISO 1856 |
| Cal 117 | | TECHNICAL BULLETIN 117-A |
| FMVSS 302 | | EN ISO 3795 |
| CRIB 5 | | BS 5852:2006 Crib ignition source 5 |

General Procedure for Manufacturing of Flexible High Resilience Foams:

All components except the gelling catalyst and the isocyanate are thoroughly mixed at 2800 rpm with the help of the Pendraulik dispergator in a 1 liter plastic bucket for 20 seconds.

After addition of the gelling catalyst the reaction mixture is first stirred under the same conditions for another 10 seconds and then, after quick addition of the whole amount of Ongronat® 1080, the whole reaction mixture is mixed for another 7 seconds at 3500 rpm.

The reaction mass is then quickly dropped into a paper box and the foam evolution is monitored via the Foamat® Apparatus.

Examples 15a-15g: Foams with Polyol A

TABLE 10

| Example No. | 15a | 15b | 15c | 15d | 15e | 15f | 15g |
|---|---|---|---|---|---|---|---|
| Ongronat ®1080 [g] | 52.42 | 40.85 | 39.74 | 39.73 | 31.76 | 31.77 | 32.88 |
| FR Polyol Ex. No. 4b [g] | 100 | 100 | — | — | 100 | — | — |
| FR Polyol Ex. No. 7a [g] | — | — | 100 | — | — | 100 | — |
| FR Polyol Ex. No. 7b [g] | — | — | — | 100 | — | — | 100 |
| water add [g] | 3.475 | 2.625 | 2.675 | 2.675 | 1.875 | 1.875 | 1.825 |
| water total [g] | 4 | 3.1 | 3.1 | 3.1 | 2.3 | 2.3 | 2.3 |
| DABCO BLV [g] | 0.1 | 0.15 | 0.15 | 0.15 | 0.18 | 0.18 | 0.18 |
| DEOA 90% [g] | 1.5 | 1 | 0.5 | 0.5 | 0.5 | 0.5 | 1 |
| Ortegol ®204 [g] | 1.5 | 1.5 | 1.5 | 1.5 | 1.5 | 1.5 | 1.5 |
| B 8783 LF2 [g] | 0.3 | 0.3 | 0.3 | 0.3 | 0.3 | 0.3 | 0.3 |
| Kosmos ®29 [g] | 0.15 | 0.15 | 0.15 | 0.13 | 0.15 | 0.18 | 0.18 |
| Rise Time [sec] | 90 | 108 | 114 | 118 | 138 | 128 | 123 |

Foam Properties

TABLE 11

| Example No. | 15g | 15a | 15b | 15c | 15d | 15e | 15f |
|---|---|---|---|---|---|---|---|
| Density [kg/m3] | 24.5 | 31.1 | 29.6 | 32.3 | 40.9 | 42.1 | 41.1 |
| Hardness [kPa] | 1.6 | 1.8 | 2.1 | 2 | 2.1 | 2.2 | 1.9 |
| SAG | 2.9 | 3 | 2.9 | 2.9 | 3.1 | 3.2 | 3.3 |
| Airflow [L/sec] | 1.04 | 1 | 0.4 | 0.53 | 0.9 | 0.95 | 1.07 |
| CS dry 50, % | 9.9 | 6.7 | 8.8 | 9.6 | 7.5 | 8.7 | 12.8 |
| Resilience, % | 52 | 55 | 47 | 47 | 54 | 53 | 53 |
| Cal 117 | Pass | Pass | Pass | Pass | Pass | Pass | Pass |
| FMVSS | SE/NBR | SE | SE | SE | DNI | DNI | DNI |

Examples 16a-16i: Foams Without Melamine Part 1

TABLE 12

| Example No. | 16a | 16b | 16c | 16d | 16e | 16f | 16g | 16h | 16i |
|---|---|---|---|---|---|---|---|---|---|
| Ongronat ®1080 [g] | 39.70 | 39.73 | 39.70 | 39.16 | 39.01 | 38.46 | 30.46 | 30.48 | 48.24 |
| FR Polyol Ex. No. 6a [g] | 100 | 100 | — | — | — | — | 100 | — | 100 |
| FR Polyol Ex. No. 6b [g] | — | — | 100 | 100 | — | — | — | 100 | — |
| FR Polyol Ex. No. 6c [g] | — | — | — | — | 100 | 100 | — | — | — |
| water add [g] | 2.65 | 2.65 | 2.65 | 2.675 | 2.78 | 2.8 | 2 | 2 | 3.425 |
| water total [g] | 3.1 | 3.1 | 3.1 | 3.1 | 3.1 | 3.1 | 2.3 | 2.3 | 3.9 |
| DABCO BLV [g] | 0.2 | — | — | — | — | — | — | — | — |
| Niax A1 [g] | — | 0.2 | 0.2 | 0.2 | 0.2 | 0.2 | 0.2 | 0.25 | 0.15 |
| DEOA 90% [g] | 0.75 | 0.75 | 0.75 | 0.5 | 0.75 | 0.5 | 0.5 | 0.5 | 1 |
| Ortegol ®204 [g] | 1.5 | 1.5 | 1.5 | 1.5 | 1 | 1 | 1 | 1 | 1.5 |
| B 8783 LF2 [g] | 0.3 | 0.3 | 0.3 | 0.3 | 0.3 | 0.3 | 0.3 | 0.3 | 0.3 |
| Kosmos ®29 [g] | 0.1 | 0.15 | 0.1 | 0.12 | 0.12 | 0.12 | 0.12 | 0.12 | 0.1 |
| Rise Time [sec] | 140 | 100 | 114 | 112 | 120 | 120 | 150 | 130 | 100 |

Foam Properties

TABLE 13

| Example No. | 16a | 16b | 16c | 16d | 16e | 16f | 16g | 16h | 16i |
|---|---|---|---|---|---|---|---|---|---|
| Density [kg/m3] | 33.1 | 30.8 | 33.7 | 31.0 | 29.9 | 30.2 | 40.6 | 40.6 | 25.9 |
| Hardness [kPa] | 3.6 | 3.4 | 3.8 | 3.4 | 3.3 | 3.4 | 4.5 | 4.4 | 3.3 |
| SAG | 3.3 | 3.1 | 3.6 | 3.2 | 3.2 | 2.9 | 3.2 | 3.2 | 3.0 |
| Airflow [L/sec] | 1.1 | 1.4 | 1.2 | 1.3 | 0.9 | 1.4 | 1.0 | 1.1 | 1.0 |
| CS dry 50, % | 5.1 | 5.9 | 7.4 | 5.9 | 5.8 | 5.4 | 8.2 | 8.0 | 8.9 |
| Resilience, % | 52.0 | 50.0 | 54.0 | 50.0 | 48.5 | 52.0 | 52.0 | 50.5 | 48.5 |
| Cal 117 | pass | pass | pass | pass | pass | pass | pass | pass | pass |
| FMVSS | SE | DNI | DNI | DNI | SE | DNI | DNI | DNI | SE |

Examples 17a-17h: Foams Without Melamine Part 2

TABLE 14

| Example No. | 17a | 17b | 17c | 17d | 17e | 17f | 17g | 17h |
|---|---|---|---|---|---|---|---|---|
| Ongronat ®1080 [g] | 41.31 | 40.20 | 40.76 | 32.23 | 32.23 | 32.22 | 49.27 | 49.28 |
| FR Polyol Ex. No. 6a [g] | 70 | — | — | 70 | — | — | 70 | — |
| FR Polyol Ex. No. 6b [g] | — | 70 | — | — | 70 | — | — | 70 |
| FR Polyol Ex. No. 6c [g] | — | — | 70 | — | — | 70 | — | — |
| Polyol C [g] | 30 | 30 | 30 | 30 | 30 | 30 | 30 | 30 |
| water add [g] | 2.625 | 2.675 | 2.65 | 1.875 | 1.875 | 1.875 | 3.425 | 3.425 |
| water total [g] | 3.1 | 3.1 | 3.1 | 2.3 | 2.3 | 2.3 | 3.9 | 3.9 |
| DABCO BLV [g] | 0.16 | 0.18 | 0.18 | 0.25 | 0.3 | 0.2 | 0.1 | 0.12 |
| DEOA 90% [g] | 1 | 0.5 | 0.75 | 0.5 | 0.5 | 0.5 | 1 | 1 |
| Ortegol ®204 [g] | 1.5 | 1.5 | 1.5 | 1.5 | 1.5 | 1.5 | 1.5 | 1.5 |
| B 8783 LF2 [g] | 0.3 | 0.3 | 0.3 | 0.3 | 0.3 | 0.3 | 0.3 | 0.3 |
| Kosmos ®29 [g] | 0.12 | 0.12 | 0.12 | 0.12 | 0.1 | 0.12 | 0.1 | 0.1 |
| Rise Time [sec] | 143 | 120 | 131 | 150 | 140 | 153 | 112 | 111 |

Foam Properties

TABLE 15

| Example No. | 17a | 17b | 17c | 17d | 17e | 17f | 17g | 17h |
|---|---|---|---|---|---|---|---|---|
| Density [kg/m3] | 30.4 | 31.6 | 30.8 | 41.6 | 42.0 | 42.6 | 25.3 | 25.5 |
| Hardness [kPa] | 2.6 | 3.0 | 2.7 | 3.6 | 3.3 | 3.4 | 2.6 | 2.6 |
| SAG | 3.0 | 2.9 | 3.1 | 3.2 | 3.3 | 3.2 | 2.7 | 2.7 |
| Airflow [L/sec] | 1.9 | 1.3 | 1.5 | 1.5 | 1.5 | 1.5 | 1.4 | 1.2 |
| CS dry 50, % | 6.8 | 7.9 | 6.2 | 6.9 | 6.3 | 7.8 | 9.0 | 9.5 |
| Resilience, % | 54.0 | 52.0 | 51.5 | 53.0 | 52.5 | 48.0 | 51.0 | 50.0 |
| Cal 117 | pass | pass | pass | pass | pass | pass | pass | pass |
| FMVSS | DNI | DNI | DNI | DNI | DNI | DNI | SE | DNI |

Examples 18a-18i: Foams Without Melamine Part 3

TABLE 16

| Example No. | 18a | 18b | 18c | 18d | 18e | 18f | 18g | 18h | 18i |
|---|---|---|---|---|---|---|---|---|---|
| Ongronat ®1080 [g] | 40.92 | 40.90 | 40.89 | 42.00 | 34.06 | 34.02 | 32.92 | 49.99 | 49.98 |
| FR Polyol Ex. No. 6a [g] | 50 | — | — | 50 | 50 | — | — | 50 | — |
| FR Polyol Ex. No. 6b [g] | — | 50 | — | — | — | 50 | — | — | 50 |
| FR Polyol Ex. No. 6c [g] | — | — | 50 | — | — | — | 50 | — | — |
| Polyol C [g] | 50 | 50 | 50 | 50 | 50 | 50 | 50 | 50 | 50 |
| water add [g] | 2.675 | 2.675 | 2.675 | 2.625 | 1.825 | 1.825 | 1.875 | 3.425 | 3.425 |
| water total [g] | 3.1 | 3.1 | 3.1 | 3.1 | 2.3 | 2.3 | 2.3 | 3.9 | 3.9 |
| DABCO BLV [g] | 0.16 | 0.16 | 0.14 | 0.14 | 0.25 | 0.2 | 0.2 | 0.12 | 0.12 |
| DEOA 90% [g] | 0.5 | 0.5 | 0.5 | 0.5 | 1 | 1 | 1 | 1 | 1 |
| Ortegol ®204 [g] | 1.5 | 1.5 | 1.5 | 1.5 | 1.5 | 1.5 | 1.5 | 1.5 | 1.5 |
| B 8783 LF2 [g] | 0.3 | 0.3 | 0.3 | 0.3 | 0.3 | 0.3 | 0.3 | 0.3 | 0.3 |
| Kosmos ®29 [g] | 0.12 | 0.12 | 0.12 | 0.12 | 0.16 | 0.12 | 0.12 | 0.12 | 0.1 |
| Rise Time [sec] | 110 | 113 | 117 | 120 | 120 | 150 | 146 | 100 | 115 |

Foam Properties

TABLE 17

| Example No. | 18a | 18b | 18c | 18d | 18e | 18f | 18g | 18h | 18i |
|---|---|---|---|---|---|---|---|---|---|
| Density [kg/m3] | 34.0 | 33.9 | 33.9 | 33.3 | 40.7 | 41.2 | 41.8 | 25.0 | 25.0 |
| Hardness [kPa] | 3.7 | 3.6 | 3.7 | 3.4 | 3.3 | 3.2 | 3.6 | 2.9 | 2.8 |
| SAG | 3.0 | 3.1 | 3.1 | 3.2 | 3.5 | 3.0 | 3.3 | 2.7 | 2.8 |
| Airflow [L/sec] | 0.2 | 0.5 | 0.3 | 0.6 | 1.0 | 1.2 | 1.3 | 0.7 | 0.7 |
| CS dry 50, % | 9.2 | 9.1 | 8.9 | 8.4 | 7.6 | 7.3 | 6.5 | 6.2 | 6.8 |
| Resilience, % | 33.0 | 45.5 | 42.5 | 46.0 | 52.5 | 53.0 | 51.0 | 48.0 | 49.5 |
| Cal 117 | pass | pass | pass | pass | pass | pass | pass | pass | pass |
| FMVSS | DNI | DNI | DNI | DNI | DNI | DNI | DNI | SE | SE |

Examples 19a-20b: Foams with Melamine

TABLE 18

| Example No. | 19a | 19b | 20a | 20b |
|---|---|---|---|---|
| Ongronat ®1080 [g] | 31.25 | 33.31 | 41.15 | 32.92 |
| FR Polyol Ex. No. 6b [g] | 45 | 45 | 45 | 45 |
| Polyol C [g] | — | — | 55 | 55 |
| Polyol A [g] | 55 | — | — | — |
| Polyol E [g] | — | 55 | — | — |
| Melamine [g] | 15 | 15 | 15 | 15 |
| water add [g] | 1.93 | 1.93 | 2.73 | 1.93 |
| water total [g] | 2.3 | 2.3 | 3.1 | 2.3 |
| DABCO BLV [g] | 0.18 | 0.18 | 0.12 | 0.18 |
| Ortegol ®204 [g] | 1.5 | 1.5 | 1.5 | 1.5 |
| B 8783 LF2 [g] | 0.3 | 0.3 | 0.3 | 0.2 |
| Kosmos ®29 [g] | 0.15 | 0.15 | 0.15 | 0.12 |
| Rise Time [sec] | 125 | 145 | 105 | 128 |

Foam Properties

TABLE 19

| Example No. | 19a | 19b | 20a | 20b |
|---|---|---|---|---|
| Density [kg/m3] | 37.8 | 40.1 | 31.1 | 39 |
| Hardness [kPa] | 3.4 | 3.6 | 4.9 | 5.1 |
| SAG | 2.8 | 2.9 | 2.8 | 3.3 |
| Airflow [L/sec] | 0.3 | 0.36 | 0.11 | 0.53 |
| CS dry 50, % | 5.3 | 5 | 6.5 | 5.6 |
| Resilience, % | 45 | 47 | 29 | 49 |
| Cal 117 | Pass | Pass | Pass | Pass |
| FMVSS | DNI | DNI | SE | DNI |
| CRIB 5 | Pass | Pass | Pass | Pass |

Examples 21a-22b: Foams with Melamine

TABLE 20

| Example No. | 21a | 21b | 21c | 21d | 21e | 22a | 22b |
|---|---|---|---|---|---|---|---|
| Ongronat ®1080 [g] | 45.67 | 37.68 | 37.13 | 37.03 | 56.68 | 38.67 | 57.28 |
| FR Polyol Ex. No. 6a [g] | — | — | 60 | — | 60 | — | — |
| FR Polyol Ex. No. 6b [g] | 60 | 60 | — | — | — | 70 | 70 |
| FR Polyol Ex. No. 6c [g] | — | — | — | 60 | — | — | — |
| Polyol C [g] | 40 | 40 | 40 | 40 | 40 | 30 | 30 |
| Melamine [g] | 25 | 25 | 25 | 25 | 25 | 25 | 25 |
| water add [g] | 3.03 | 2.23 | 2.25 | 2.26 | 3.91 | 2.46 | 3.83 |
| water total [g] | 3.5 | 2.7 | 2.7 | 2.7 | 4.45 | 2.9 | 4.45 |
| DABCO BLV [g] | 0.16 | 0.2 | 0.2 | 0.2 | 0.1 | 0.2 | 0.1 |
| DEOA 90% [g] | 1 | 1 | 0.75 | 0.7 | 1.7 | 0.7 | 2 |
| Ortegol ®204 [g] | 1.5 | 1.5 | 1.5 | 1.5 | 1.5 | 1.5 | 1.7 |
| B 8783 LF2 [g] | 0.3 | 0.3 | 0.3 | 0.3 | 0.3 | 0.3 | 0.3 |
| Kosmos ®29 [g] | 0.15 | 0.14 | 0.14 | 0.16 | 0.13 | 0.16 | 0.13 |
| Rise Time [sec] | 120 | 140 | 140 | 150 | 120 | 123 | 122 |

Foam Properties

TABLE 21

| Example No. | 21a | 21b | 21c | 21d | 21e | 22a | 22b |
|---|---|---|---|---|---|---|---|
| Density [kg/m3] | 34.5 | 46.1 | 46.2 | 47.1 | 27.5 | 39.7 | 28.1 |
| Hardness [kPa] | 5.68 | 6.8 | 7.07 | 6.74 | 4.45 | 4.84 | 3.87 |
| SAG | 3.19 | 3.82 | 3.63 | 3.48 | 2.76 | 3.43 | 2.98 |
| Airflow [L/sec] | 0.56 | 0.53 | 0.65 | 0.94 | 0.42 | 1.2 | 0.55 |
| CS dry 50, % | 28.7 | 24.7 | 28.4 | 30.4 | 19 | 12.3 | 30.1 |
| Resilience, % | 44 | 51 | 49 | 51 | 45 | 51 | 48 |
| Cal 117 | Pass | Pass | Pass | Pass | Pass | Pass | Pass |
| FMVSS | DNI | DNI | DNI | DNI | DNI | DNI | SE |
| CRIB 5 | Pass | Pass | Pass | Pass | Pass | Pass | Pass |

Examples 23a-23e: Moulded Foams

TABLE 22

| Example No. | 23a | 23b | 23c | 23e |
|---|---|---|---|---|
| Ongronat ®1080 [g] | 39.73 | 39.74 | 31.77 | 32.88 |
| FR Polyol Ex. No. 7b [g] | 100 | — | 100 | — |
| FR Polyol Ex. No. 13 [g] | — | 100 | — | 100 |
| Melamine [g] | 15 | 15 | 15 | 15 |
| water add [g] | 2.675 | 2.675 | 1.875 | 1.825 |
| water total [g] | 3.1 | 3.1 | 2.3 | 2.3 |
| DABCO BLV [g] | 0.15 | 0.15 | 0.18 | 0.18 |
| DEOA 90% [g] | 0.5 | 0.5 | 0.5 | 1 |
| Ortegol ®204 [g] | 1.5 | 1.5 | 1.5 | 1.5 |
| B 8783 LF2 [g] | 0.3 | 0.3 | 0.3 | 0.3 |
| Kosmos ®29 [g] | 0.13 | 0.15 | 0.18 | 0.18 |
| Rise Time [sec] | 100 | 100 | 109 | 106 |

Foam Properties

TABLE 23

| Example No. | 23a | 23b | 23c | 23e |
|---|---|---|---|---|
| Density [kg/m3] | 30.4 | 30.4 | 40.9 | 39.7 |
| Hardness [kPa] | 2.4 | 2.6 | 2.8 | 2.5 |
| SAG | 3.1 | 3.1 | 3.4 | 3.5 |
| Airflow [L/sec] | 0.68 | 0.46 | 0.56 | 0.65 |
| CS dry 50, % | 9.1 | 7.5 | 6.6 | 7.5 |
| Resilience, % | 51 | 51 | 55 | 55 |
| Cal 117 | Pass | Pass | Pass | Pass |
| FMVSS | DNI | SE | DNI | DIN |
| CRIB 5 | Pass | Pass | Pass | Pass |

The invention claimed is:

1. A method for preparing a flame-resistant polymer-modified polyol dispersion having a solid content from 1 to 65 wt % based on the total weight of the dispersion comprising:
   reacting at least one polyisocyanate and an olamine in the presence of a base polyol having at least two active hydrogen containing groups of which more than 50% are primary active hydrogen containing groups, and a cross-linking agent having a weight average molecular weight from 500 to 800 g/mol,
   wherein the olamine has at least one phosphonic ester group attached to a tertiary nitrogen atom and has at least two hydroxyl groups; and
   wherein the ratio of NCO:OH equivalents between the NCO groups of the at least one polyisocyanate and the at least two hydroxyl groups of the olamine is in the range from 0.5:1 to 1.5:1.

2. The method according to claim 1, wherein the base polyol has a molecular weight from 2000 g/mol to 15000 g/mol.

3. The method according to claim 2, wherein the base polyol has 2-8 hydroxyl groups.

4. The method according to claim 1, wherein the base polyol is a polyether polyol wherein greater than 50% of the hydroxyl groups of the polyether polyol are primary hydroxyl groups.

5. The method according to claim 1, wherein the base polyol is a polyether polyol wherein up to 85% of the hydroxyl groups of the polyether polyol are primary hydroxyl groups.

6. The method according to claim 1, wherein the at least one polyisocyanate is in an isocyanate mixture, and wherein the isocyanate mixture further comprises up to 40 mol % of a monoisocyanate.

7. The method according to claim 1, wherein the ratio of NCO:OH equivalents between the NCO groups of the at least one polyisocyanate and the at least two hydroxyl groups of the olamine is in the range from 0.85:1 to 1.2:1.

8. The method according to claim 7, wherein the ratio of NCO:OH equivalents between the NCO groups of the at least one polyisocyanate and the at least two hydroxyl groups of the olamine is in the range from 0.9:1 to 1.15:1.

9. The method according to claim 1, wherein the olamine has the structural formula (I)

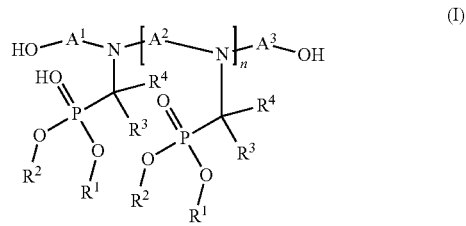

(I)

wherein
   each $R^1$ and $R^2$ are independently an alkyl group having 1-18 carbon atoms;
   each $R^3$ and $R^4$ are independently hydrogen atoms or hydrocarbon groups;
   each $A^1$ and $A^3$ are independently selected from

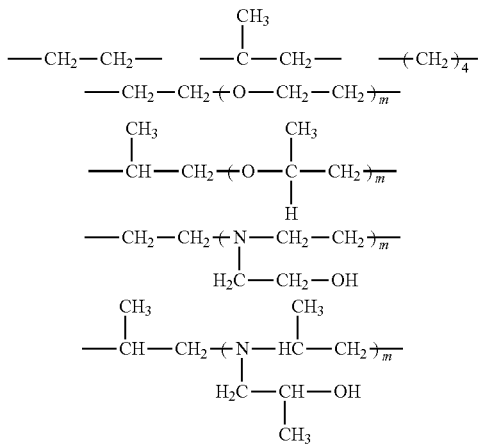

wherein m is an integer from 1 to 10;
   $A^2$ is $A^1$, an alkylene or aralylene group having 2 to 12 carbon atoms, or an arylene group; and
   n is an integer from 1 to 10.

10. The method according to claim 1, wherein the olamine has the structural formula (II)

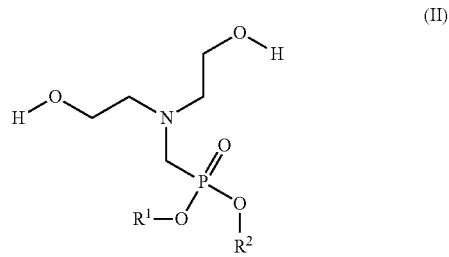

(II)

wherein
   $R^1$ and $R^2$ are each independently an alkyl group having 1-18 carbon atoms, aryl, or aralkyl.

11. The method according to claim 1, wherein the cross linking agent has a functionality of 2 to 8 active hydrogen containing groups capable of reacting with isocyanate functions.

12. The method according to claim 11, wherein the cross linking agent has hydroxyl functions.

13. The method according to claim 1, wherein the cross linking agent is a polyether polyol.

14. The method according to claim 1, wherein the amount of cross linking agent present in the reacting step is from 0.1 to 11 g per 100 g of the flame-resistant polymer-modified polyol dispersion.

15. The method according to claim 1, wherein said reacting is performed in the presence of water; low molecular weight hydroxyl or amino containing compounds; catalysts; flame retardants; organic or inorganic fillers; synergists; or any combination thereof.

16. The method according to claim 1, wherein said reacting is performed at a temperature of 30° C. to 170° C.

17. The method according to claim 1, wherein said reacting is performed in a continuous manner.

18. A polymer-modified polyol dispersion generated according to the method of claim 1.

19. A method for preparing flame-resistant, optionally foamed polyurethane plastics, wherein at least one polyisocyanate is reacted with the polymer-modified polyol dispersion according to claim 18, optionally in the presence of water and/or volatile organic substances as blowing agents; catalysts; foaming auxiliaries and additives; chain-extending and/or crosslinking agents; organic or inorganic filling materials; flame retardants and/or synergists.

20. A method for preparing a flexible polyurethane foam comprising providing the polymer-modified polyol dispersion according to claim 18 and processing this polymer-modified polyol into a flexible polyurethane foam.

* * * * *